(12) United States Patent
Osgood

(10) Patent No.: US 7,331,159 B2
(45) Date of Patent: Feb. 19, 2008

(54) PACKAGING METHODS AND PACKS MADE THEREBY

(75) Inventor: Dave Osgood, Herts (GB)

(73) Assignee: Innovia Films Limited, Cumbria (GB)

( * ) Notice: Subject to any disclaimer, the term of this patent is extended or adjusted under 35 U.S.C. 154(b) by 559 days.

(21) Appl. No.: 10/502,604

(22) PCT Filed: Feb. 17, 2003

(86) PCT No.: PCT/EP03/01574

§ 371 (c)(1),
(2), (4) Date: Jul. 27, 2004

(87) PCT Pub. No.: WO03/072455

PCT Pub. Date: Sep. 4, 2003

(65) Prior Publication Data

US 2005/0050851 A1 Mar. 10, 2005

(30) Foreign Application Priority Data

Feb. 27, 2002 (GB) .................................. 0204602.7

(51) Int. Cl.
*B65B 61/18* (2006.01)
(52) U.S. Cl. .......................................... 53/412; 53/461
(58) Field of Classification Search ............... 53/136.8, 53/461
See application file for complete search history.

(56) References Cited

U.S. PATENT DOCUMENTS

| | | | |
|---|---|---|---|
| 2,079,328 A | | 5/1937 | McBean |
| 2,195,222 A | * | 3/1940 | Neumair ...................... 53/412 |
| 2,334,381 A | * | 11/1943 | Bronander .................. 493/346 |
| 2,691,856 A | * | 10/1954 | Thormod et al. .......... 53/133.7 |
| 5,630,308 A | * | 5/1997 | Guckenberger .............. 53/412 |
| 6,061,997 A | * | 5/2000 | Ozaki et al. .................. 53/412 |
| 6,138,437 A | * | 10/2000 | Focke et al. ............... 53/133.7 |

FOREIGN PATENT DOCUMENTS

| | | |
|---|---|---|
| EP | 0 473 517 | 3/1992 |
| EP | 0 577 509 | 1/1994 |
| EP | 0 595 722 | 5/1994 |

\* cited by examiner

*Primary Examiner*—John Sipos
(74) *Attorney, Agent, or Firm*—Wenderoth, Lind & Ponack, L.L.P.

(57) ABSTRACT

There is described a method for wrapping an article using a web of packaging film having at least one tar line thereon in the MD, the method comprising the steps of: (a) forming at regular intervals in the MD a tab on the film, the tab having a free end connected by free sides to an opposite end of the tab attached to the film, the tab being positioned on the film so the axis of at least one tear line in the MD passes through both ends of the tab; (b) severing the film web to form sheets by cutting substantially along an axis across the TD of the web, the axis passing across the tab between its ends, where the tab along said axis is not substantially severed there through so the tab protrudes from the leading edge of the sheet; (c) wrapping a sheet formed from step (b) around an article to form a tube with the cut sides of the sheet overlapping, where the free end of the tab lies on the top of the overlap on the outside of the tube and where the cut sides of the sheet overlap at least to the extent that the tab in the film on the top surface overlaps with film underneath, and (d) sealing the film together within the overlap region by a sealing means which: (i) seals more strongly in the overlap region outside a tear line region inside the overlap, where the tear line region is defined by the cut edges of the overlap region (ex TD) and a pair of axes parallel to the non-cut sides of the film sheet (ex MD) each axis passing through the respective widest points of the side of the tab; so the free end of the tab is either unsealed or only weakly sealed to the film; and (e) wrapping the ends of the tube around the article and sealing the ends to form a sealed package around the article, the package readily openable by pulling the free tab end to initiate tearing along the tear line. Packaging (such as cigarette cartons) wrapped with films by this method are also described.

15 Claims, 2 Drawing Sheets

PACKAGING METHODS AND PACKS MADE THEREBY

This invention concerns methods of wrapping articles with packaging films and packages produced thereby which include means for facilitating their opening.

Flexible polymeric films are widely used as packaging materials for a vast range of goods. A variety of synthetic polymers may be used as packaging materials, for example films made from synthetic polymers such as polyolefins (e.g. polyethylene and/or polypropylene), polystyrene and/or polyesters; and/or films made from natural polymers such as cellulosic materials and/or other biopolymers (e.g. polylactic acid).

One particular packaging use for such films is as an overwrap for a variety of goods, for example for cigarette packets, video tapes, foodstuffs etc., the films being sealed tightly over the goods. However, the very properties which confer desirable properties on the films as packaging materials, for example high strength and tear resistance, make such packages difficult to open because the films of which they are made are difficult to tear.

In order to facilitate the opening of such packages, so-called "tear tapes" have been provided which consist of a narrow strip of a polymeric film adhered to the internal surface of the packaging film, a tab of the tear tape being left free on the outside of package to facilitate its opening. The package can then be opened by pulling the tear tape through the packaging film.

Another method proposed to open a package wrapped in film is to provide inherent in the film one or more lines of weakness on the film. Two lines are generally preferred to define a film strip of sufficient width so a free tab end attached thereto can be easily grasped and pulled. To open the pack the tab is pulled to tear the film completely around the pack along both lines of weakness to remove the strip which severs the film and hence opens the pack.

Lines of weakness on the film have advantages over use of a separate tear tape as they are integral to the film and do not require additional processing steps or extra material. A tear tape increases the thickness of the film where it is added resulting in an uneven film surface which can reduce the seal integrity of the pack. The mechanical properties desired for a separate tear tape are different from those required for an overwrap film. So the tear tape and film are often made from different, incompatible materials which can make it difficult to provide a good heat seal in regions of the pack where the overwrap film is adjacent the tear tape.

Lines of weakness can be made by any suitable methods for example by mechanical scoring (e.g. with a controlled blade or roller to applies pressure to the film surface), by cut or scored perforations, by non contact means such as laser or other radiation to ablate and/or burn off a thickness of film (e.g. as described in U.S. Pat. No. 3,909,582; U.S. Pat. No. 5,630,308 (both American Can) or U.S. Pat. No. 5,010,325 and U.S. Pat. No. 5,010,231 (both LPF)); by use of a laser to scramble orientation along a line on the oriented film without ablating the film surface (as described in the applicant's co-pending application PCT/EP02100075); and/or by the methods described in WO 01/15594 (Hoescht) or WO 01/94098 (University of Warwick).

Although tear tapes and tear lines can be a good and efficient way of opening such packages, it can be difficult to initiate the tear. To this end a notch or tab is typically cut on the sheet around the tear tape or line so that the tab can be easily grasped and pulled to propagate a tear along the weakened line or tear tape to completely sever the wrapped film around the package. Such tabs are generally U shaped with sides parallel to the tear line or V shaped where the sides taper towards the free end. However any shaped tab may be used with the present invention such as those tabs described in the applicant's co-pending British patent application (applicant's case reference 31.14 GB) filed the same day as the present application. The contents of this co-pending application are incorporated herein by reference.

Before being used to wrap an article the film web is cut across the width of the web in the transverse direction (TD) to form sheets which are used to wrap each article. For convenience this cut is referred to herein as the "sheet line". The tear lines or tear tape are arranged on the sheet to run in a perpendicular direction, the machine direction (MD). The tab will be cut in the web to lie across the sheet line, i.e. the tab will protrude from the leading edge of one sheet and thus form a correspondingly shaped in the trailing edge of the following sheet. The tab will also be positioned to straddle the tear tape, or tear line(s). To prevent the tabbeing ripped off the film in the process of opening the pack, the sheet line has an uncut gap (i.e. where the web is still attached) which is in register with the position of the tear lines. This can be achieved by any suitable means for example the slitting knife may have a notch positioned in register with the tear lines or tear tape.

To wrap a pack (e.g. cigarette carton) or articles (e.g. line of biscuits wrapped in a tube) there will be some overlap between the trailing and leading edges of a sheet as it wraps around the article and this overlap of film is where the film is heat sealed together for example by being offered up to a heated metal bar. When the overlapped film is sealed together the film initially forms a tube around the article. The open ends of the tube can then folded around the article and heat sealed together to form an air tight seal enclosing and protecting the article. If the tab is larger that the overlap region the corresponding notch cut in the sheet trailing edge will protrude beyond the sealed region of overlap and seal integrity will be lost. Yet it is desired that the overlap region is as small as possible consistent with a good heat seal for the following reasons. A large area of overlap for each sheet is expensive as it wastes film but also the heat sealed overlap is less transparent (for clear films), may spoilt the visual look of the wrapping and/or may be difficult to print. For this reason the sheet line is positioned about half way up the tab so that the overlap region is not too large.

However problems have been found with the use of tabs and the overlap region on a package. If the region of overlap is heat sealed the free end of the tab will be difficult to find as it will be sealed to the underlying film in the overlap region. Too strong a seal in the overlap region can also pose problems as then it can be difficult for a tear to propagate through the region of overlap. On the other hand if the overlap region around the tab is left unsealed or the seal strength in the overlap region is reduced to aid tearing this will compromise the seal integrity of the pack which is also undesirable.

Thus it is desirable to provide a improved means for wrapping an article to form a package which can be readily opened by hand, optionally whilst retaining good seal integrity of the package before opening.

Therefore according to the present invention there is provided a method for wrapping an article using a web of packaging film having at least one tear line thereon in the MD, the method comprising the steps of:

(a) forming at regular intervals in the MD a tab on the film, the tab having a free end connected by free sides to an opposite end of the tab attached to the film, the tab being positioned on the film so the axis of at least one tear line in the MD passes through both ends of the tab;

(b) severing the film web to form sheets by cutting substantially along an axis across the TD of the web, the axis passing across the tab between its ends, where the tab along said axis is not substantially severed there through so the tab protrudes from the leading edge of the sheet;

(c) wrapping a sheet formed from step (b) around an article to form a tube with the cut sides of the sheet overlapping, where the free end of the tab lies on the top of the overlap on the outside of the tube- and where the cut sides of the sheet overlap at least to the extent that the tab in the film on the top surface overlaps with film underneath and the following regions are defined a sealing region (d) sealing the film together within the overlap region by a sealing means which:

(i) seals more strongly in the overlap region outside a tear line region inside the overlap, where the tear line region is defined by the cut edges of the overlap region (ex TD) and a pair of axes parallel to the non cut sides of the film sheet (ex MD) each axis passing through the respective widest points of the side of the tab;

so the free end of the tab is either unsealed or only weakly sealed to the film; and (e) wrapping the ends of the tube around the article and sealing the ends to form a sealed package around the article, the package readily openable by pulling the free tab end to initiate tearing along the tear line.

Preferably the tab is cut into the film web, optionally at the same time as the sheets are formed, and therefore in step (a) the tab may be on the film by cutting the film by a contact means (e.g. tab knife) or non-contact means (e.g. laser).

An optional feature of the method of the invention comprises that in step (b) the film web is severed to form sheets with a partially protruding tab on the leading edge of one sheet and a corresponding notch in the trailing edge of the following sheet.

Preferably in step (c) the cut sides of the sheet overlap to the extent that a spacing region exists substantially within the tear line region, the spacing region defined by the sides of the tear line region and a pair of axes (ex TD) respectively the trailing edge of the sheet underneath the overlap and an axis parallel thereto passing through the attached end of the tab. More preferably if a tab and notch are cut into the sheet the parallel axes defining the spacing region pass through respectively the top of the notch and the attached end of the tab.

Preferably in step (d) if the tear line region comprises a spacing region and/or a notch region (together referred to as sealing region) then the sealing means additionally (ii) seals the film inside the sealing region more strongly than within the tab region. More preferably at lest part of the free end of the tab remains substantially unsealed to the film.

Preferably the sealing means is a heating means held adjacent the overlap region to heat seal the film therein. More preferably the heating means is a heated metal bar offered up to the overlap region but other non contact means such as radiative heaters may also be used. Most preferably to provide a heat seal of differential strength within the various defined regions on the overlap (tab region, spaced region etc) the heating means may supply heat to the film non homogeneously over the overlap region. This may be achieved by for example a heater bar constructed from different materials so the heat output from defined areas on the heater surface is different. For example insulating materials and/or conductive strips may be inlayed into (or placed across) the heater surface (e.g. see the Figures and Examples herein). As an alternative a radiative heater may be supplied with a suitably patterned shadow mask to differentially heat the various regions of the overlap. It will be appreciated that the choice of the insulator and/or conductive material inlayed into the heating surface of a heater bar used in the method of the present invention can be tailored to provide the desired relative heat strengths for each of the regions defined and differentially heated as described herein.

As can be seen the tab may be cut into the film by any suitable means (mechanical knife, laser cutter etc) so the tab forms an integral part of the film. However it would also be possible to attach a tab to the film by adhesives, heat sealing or any other suitable method in which case the overlap region could be reduced.

As used herein "tear line" denotes a separate tear tape laminated to the film; and/or one or more line of weakness integral to the film (e.g. two lines which define a tearable film strip) and the tear line may be made by any suitable method such as those described herein. The tear line may be torn therealong by finger pressure when the free end of the tab is grasped and pulled from away from the film.

The tear line as described herein may comprise in whole or in part regions which are substantially continuous and/ore substantially discontinuous (for example the tear line may comprise at regular intervals a plurality of spots and/or dashes of film defining a perforation on the film). However if the tear line is discontinuous it should still be such that a tear once started will propagate essentially along the line and thus move from one weakened section to the next. For some applications it is preferred that a tear line does not perforate the film as this could seriously reduce the barrier properties of the film. It is also preferred that the tab described herein is cut through only a single layer of film on the pack (i.e. the film wrapped underneath the tab protects the pack).

As well as of use to facilitate opening of an overwrapped pack the tear line as described herein may also be used for other purposes such as to remove certain regions of film to create patterns thereon and/or to create aesthetic and/or other properties on the film.

It is preferred that the uncut region of the sheet line is from about 1 mm to about 2 mm wider that the width of the defined tear tape so be sure that the tab will not tear off the film when pulled. So for example for a typical tear tape of width about 4 mm (or two tear lines space 4 mm apart) the uncut region of the sheet line would be about 8 mm wide.

It is preferred that the cut into the tab is from about 1 mm to about 2 mm on each side to ensure complete separation between sheets. For example for a typical tear tape of width about 4 mm (or two tear lines space 4 mm apart) and an uncut region of the sheet line of about 8 mm wide, a preferred tab is shaped to taper out to a maximum width of about 12 mm and the cut sheet line would penetrate the cut sides of the tab by about 2 mm on each side. For such a tab there would be a central region of 8 mm where the tab was securely attached to the sheet. Shaped tabs of this type are more fully described in the applicant's co-pending British patent application (applicant's case reference 31.14 GB).

It will be appreciated too that the length of the cut tab should also be as small as possible consistent with being capable of being readily grasped by the figures sufficiently strongly so the tab can be pulled to initiate tearing to avoid an unnecessary large overlap region.

Preferably the tab is substantially symmetrical about an axis parallel to the tear line(s).

Preferred films of the invention comprise oriented material, more preferably oriented polymeric material and most preferably biaxially oriented polymers such as BOPP.

The applicant has found that packages formed by the method described herein are advantageous as the tear line can be more readily torn through the overlap region whilst maintain a good seal integrity in the pack before opening.

Other aspects of the invention and preferred features thereof are given in the claims.

Once the film has been sealed around the article to form a package tearing of the film substantially along a tear line preferably occurs with peeling of the seal. The film can be heat or cold sealed around the article.

Optionally the tear line extends to the edge of the film on the package to assist tearing therealong.

A single tear line can be used when integral on the film, so that the package can be opened by tearing it open substantially along this line. But it is generally preferred to include at least a pair of such lines which are substantially mutually parallel and define a strip of film, which can be torn away from the rest of the film, much in the manner in which packages having a tear tape are opened but without the necessity for having such a tape. In such a case it is preferred that the tab straddles both lines (i.e. lies across the width of the complete tear strip) as this better directs the tear to propagate along both sides of the strip so the complete strip can be removed to sever the packaging film.

When more than one weakened tear line (integral to the film) is used, the distance between the individual lines is not limited by the cost considerations which apply when separate tear tapes are used because tearing of films and packages in accordance with the present invention can be effected without the use of such tapes. However, it is generally preferred that when two lines are used they be at least about one mm apart in order to facilitate being able physically to take hold of the end of the edge of the film when the package is to be opened and also to minimise the risk that tearing transfers from the two lines into only one when the package is opened. As will be appreciated, the unsealed cut tab shaped as described herein will make this easier. However, the lines can be spaced considerably further apart, for example about 10 mm apart or more, but a preferred distance apart is in the range of from about 2 to about 6 mm.

It has been proposed hitherto to use coloured tear tapes in order to facilitate being able to see the end of the tape and thereby opening of the packages. If integral tear lines are used a portion of the film between two tear lines (the tear strip) may be coloured. Also, for example a coloured tear tab can be used rather than colouring the whole of the tear strip. Other suitable means could be used to indicate the position of the tab is where tearing should be initiated to open the film. For example a printed indication near the tab, the optical properties of the film could be adjusted by treated or other means, or another method could be used to mark the tab from the surrounding film.

The direction of the tear line(s) herein relative to the film itself is in general unimportant, particularly with films having balanced properties. However, it is usually convenient to make these tear line(s) along the direction in which the film is manufactured (MD), and this can be particularly conveniently effected during operations subsequent to the film production process, for example during slitting of a larger rolls of film to produce reels of film which are to be used on a packaging machine.

The films in which shaped tabs as described herein are introduced according to the present invention may be any suitable substrate(s), such as one or more of any of the following: polymeric materials: synthetic paper, films made from organic polymers, preferably biopolymers, more preferably films made from one or more suitable carbohydrates; polysaccharides (such as starch, cellulose, glycogen, hemicellulose, chitin, fructan inulin; lignin and/or pectic substances); gums; proteins, optionally cereal, vegetable and/or animal proteins (such as gluten [e.g. from wheat], whey protein, and/or gelatin); colloids (such as hydro-colloids, for example natural hydrocolloids, e.g. gums); polylactic, polygalactic and/or cellulosic films (e.g. microbal and/or regenerated cellulose film)]; thermoplastic films; polymeric films (for example films comprising: polyolefins [e.g. polypropylene and/or polyethylene] polyurethanes, polyvinylhalides [e.g. PVC], polyesters [e.g. polyethylene terephthalate —PET], polyamides [e.g. nylons] and/or non-hydrocarbon polymers); and/or multilayer and/or composite sheets formed by any suitable combinations and/or mixtures of thereof.

Preferred films for use in the present invention may be produced from a variety of synthetic polymers, for example may be polyolefin based films, e.g. polyethylene based, polypropylene based or made from polystyrene, or they may be polyester based films. Furthermore, films of the present invention may be in the form of monolayers of a particular polymer, although preferred films comprise two or more layers which can be formed by coextrusion and/or by coating.

The films are preferably heat sealable, and it is generally preferred that when they have been heat sealed the heat seals themselves have peel strengths less than the force required to tear the film along the tear line(s) in order to facilitate propagation of these tears through the heat seal and then into non-sealed regions of the film around the packaged articles. If desired, cold seals can be used to seal the packages, and again it is preferred that such seals should peel to allow tearing along line(s) and/or pattern(s) herein to propagate through these seals.

Biaxially oriented polypropylene (BOPP) films are preferred for producing sheets, films and/or packages in accordance with or used in the present invention. It is more preferred that the BOPP films have substantially balanced physical properties, for example as can be produced using substantially equal machine direction and transverse direction stretch ratios. Although sequential stretching can be used, in which heated rollers effect stretching of the film in the machine direction and a stenter oven is thereafter used to effect stretching in the transverse direction, it is generally preferred to use biaxially oriented films which have been produced by simultaneous stretching, for example using the so-called double bubble process or a simultaneous draw stenter. The machine direction and transverse direction stretch ratios are preferably in the range of from 4:1 to 10:1, and more preferably from 6:1 to 8:1.

The films used in accordance with the present invention can be of a variety of thicknesses according to the requirements of the packages which are to be produced. For example they can be from about 10 to about 120 microns thick, and preferably from about 14 to about 40 microns thick.

The tear line(s) should exhibit properties (e.g. a degree of weakening therealong) which are sufficient to enable a tear once started to propagate substantially along the line(s) and/or pattern(s) in which it has started without substantial deviation therefrom. Insufficient tear susceptibility will make it difficult if not impossible to starting a tear therealong. However excessive tear susceptibility (e.g. too much weakening) could result in unwanted opening of the packages during normal handling. As will be appreciated by those skilled in the art, different methods of achieving tear susceptibility of the films can result in different tearability.

Although packages in accordance with the invention can be opened by tearing the films substantially along either tear susceptible line(s) or with use of a tear tape, both a weakened tear line and a tear tape can be used in together for example to facilitate the tearing of films which are otherwise difficult to open with a tear tape, e.g. with particularly thick films or films made of polymers which are inherently resistant to tearing.

Unless the context indicates otherwise, the terms 'effective' and/or 'suitable' as used herein (for example with reference to the methods and packages of the present invention) will be understood to refer to those features which if used in the correct manner provide the required properties (such as an improved tearable package) to the present invention as described herein.

It is appreciated that certain features of the invention, which are for clarity described in the context of separate embodiments may also be provided in combination in a single embodiment.

Conversely various features of the invention, which are for brevity, described in the context of a single embodiment, may also be provided separately and/or in any suitable sub-combination.

Embodiments of methods and packs according to the present invention will now be described by way of example with reference to the accompanying drawings. Features in each drawing are given number labels with the numbering in each drawing starting at the next hundred (i.e. 100s for FIG. 1, 200s for FIG. 2 etc). Similar and/or analogous features in each drawing are labelled by numbers separated by an whole number multiple of one hundred (e.g. features 101, 201 and 301 each refer to the heater surface of a heater bar in FIGS. 1, 2 and 3 respectively).

For convenience in each of the FIGS. 1 to 5 herein the web axes MD (machine direction) and TD (transverse direction) are shown to indicate the orientation of the heater or sheets in the packaging machine during use.

Figure 1:
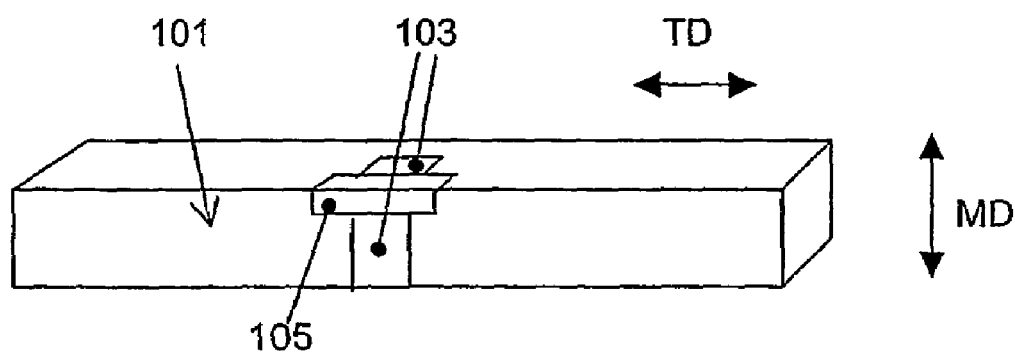
FIGS. 1, 2, 3 show perspective views of the heating surface of various heater bars used to heat seal the overlap region in the methods described herein.

FIG. 1 shows a heating bar of the type used to heat seal the overlap region in a pack made as described in Example 1 herein. The bar comprises a heating surface (101) which is offered up to the overlapped film to heat seal the film together as described herein. The heating surface (101) has an insulator (103) inset therein in register with the tab on the overlap so this part of the overlap only weakly seals. At the top of the insulator is a thin metal conducting strip (105) in register with the spacing region on the overlap which acts to seal this region more strongly.

Figure 2:
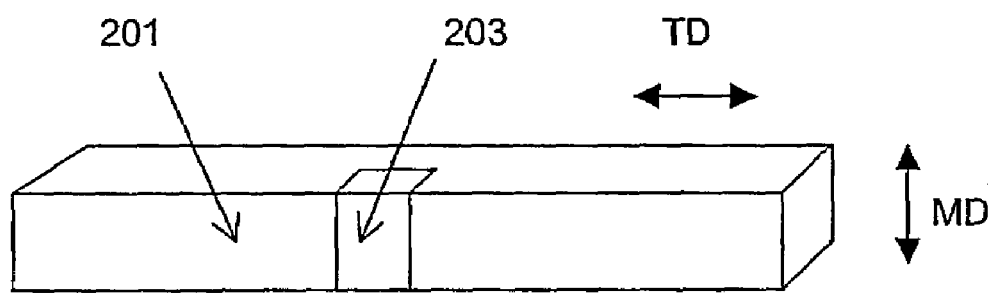

FIG. 2 shows a heating bar with a heating surface (201) having an insulator (203) inset therein as used in Example 2. Unlike FIG. 1 there is no thin conducting strip on the heater surface (201) the so the whole of the tab region including the spacing region is weakly sealed.

Figure 3:
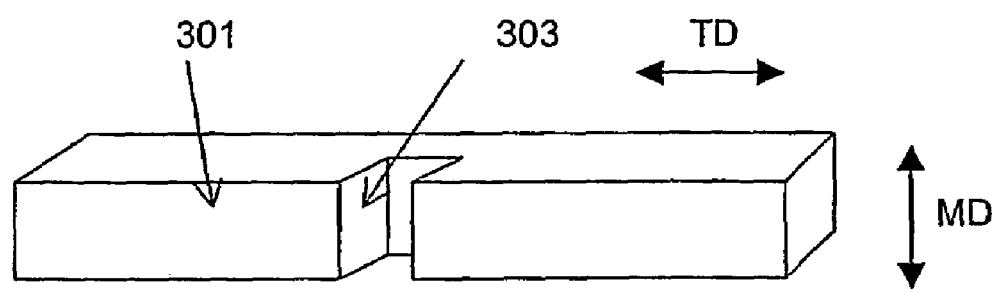

FIG. 3 shows a conventional heater bar with a heating surface (301) having a gap (303) machined therein as used in comparative example Comp B. No heat seal is formed opposite the gap so the whole of the tab region on the pack is unsealed.

Figure 4:
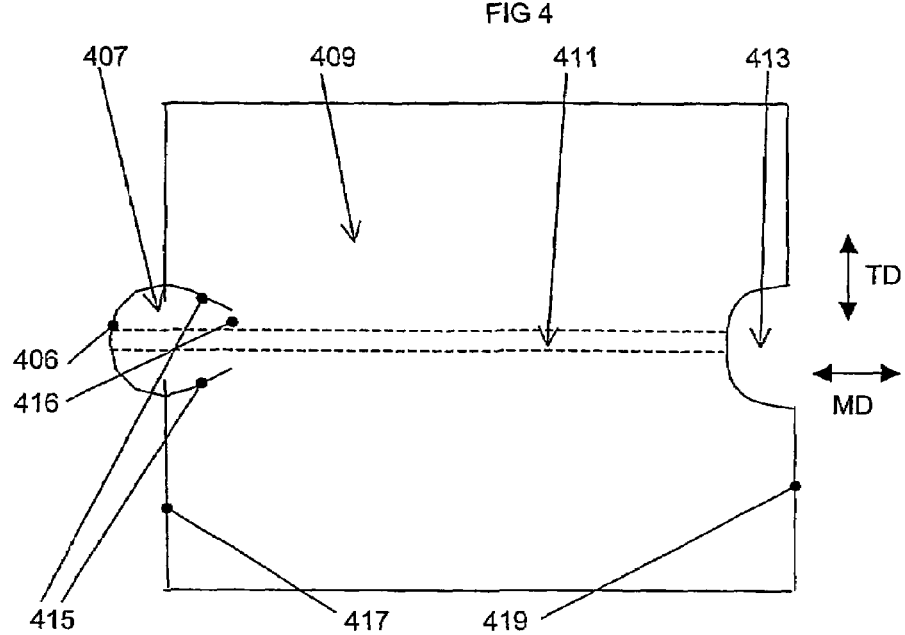
FIG. 4 shows a typical cut sheet used to wrap a pack in a method of the invention showing a weakened line thereon and a preferred arrangement of the cut tab and notch.

FIG. 4 is a sheet (409) cut from the film web which can be used in the method of the invention to wrap articles as described herein. The sheet comprises a tear strip (411) formed in the MD (shown by the paired of dashed lines) and a pull tab (407) cut by a tab knife (not shown), the tab (407) having a free end (406) protruding from the leading edge (417) of the sheet edge cut along the TD by a sheet knife (also not shown). There is a corresponding notch (413) cut by the tab knife into the trailing edge (419) of the sheet. The trailing edge (419) was of course also cut in the TD by the sheet knife as it cut the leading edge of the following sheet from the web. The free end (406) of the tab (407) protrudes only slightly from the sheet. Tab sides (415) are cut partially into the sheet (409) in the MD to define (where the sides finish) an attached end of the tab (416) set back from the leading edge (417) of the sheet (409). The tear strip (411) bisects the tab (407) and the notch (413) passing through both the free end (406) and attached end (416) of the tab (407).

Figure 5:
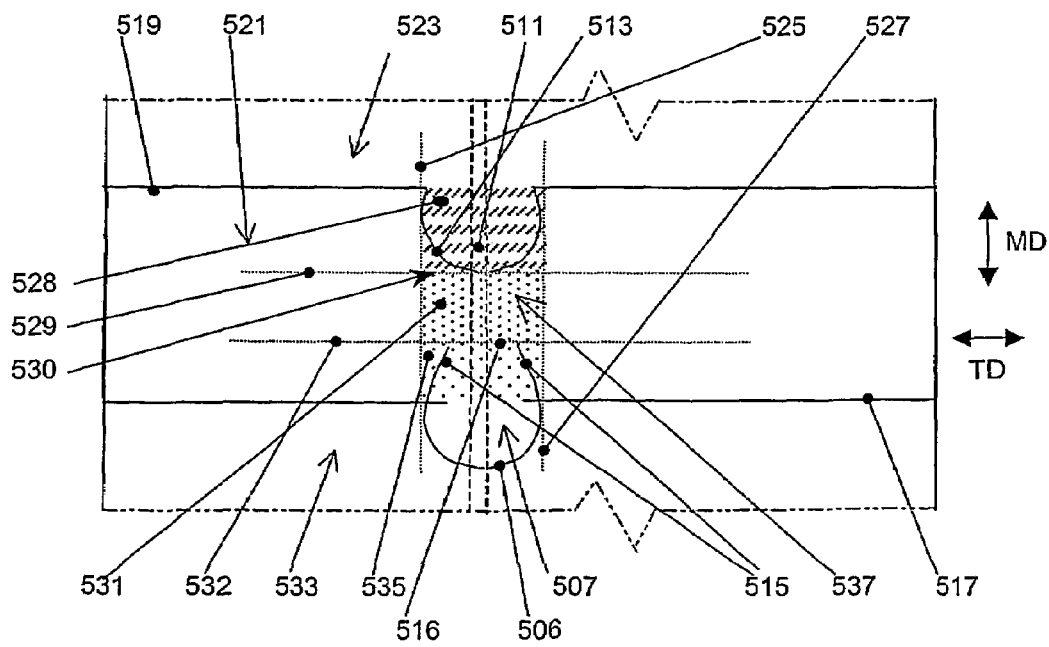
FIG. 5 shows a detailed view of the region of overlap where the sheet is heat sealed together.

The region of overlap is shown in more detail in FIG. 5. In a method of the invention the sheet (409) is wrapped around an article to be packaged to initially form a tube. The cut sides of the sheet (517 and 519) are overlapped so that part of sheet (523) adjacent the leading edge (517) will pass over the top of the overlap (i.e. lie on the outside of the tube and hence on the exterior of the pack) and that part of the sheet (533) adjacent the trailing edge will thus lie underneath (i.e. lie on the inside of the tube and hence be protected within the interior of the pack). The overlap region (indicated generally by 521, see below) comprises a double thickness of film within which lies the notch (513) covered by overlapping film and a tab (507) on top having a free end (507) protruding from the overlap region (521). The tab (507) has cut tab sides (515) defining an attached end of the tab (516) which also lies within the overlap region (521). The tear strip (511) passes in the MD as indicated by the pair of dashed lines. The sheet continues above and below the overlap region shown in FIG. 5 and this is indicated by the dashed and dotted line across the sheet in the TD at the top and bottom of FIG. 5.

Various axes and regions are shown on FIG. 5 as follows. Axes are indicated by dotted lines and regions by various shading as indicated below.

The overlap region (521) is shown in FIG. 5 (mostly) unshaded for clarity and is the area bounded by:

(a) the MD sides of the sheet; and
(b) in the TD, the trailing edge (519) of the sheet lying underneath the overlap (having the notch (513) cut therein) and the leading edge (517) of the sheet lying on top of the overlap (having the tab (507) protruding therefrom).

A notch region (528) is indicated on FIG. 5 by dashed diagonal line shading and is the area bounded by:

(a) a pair of MD axes passing just to the left (525) and the right (527) of the widest part of the tab (507) (as viewed from above the overlap region outside the tube)—these axes hereinafter referred to as the MD tab lines (525, 527); and
(b) a pair of TD axes defined by the trailing edge (519) of the sheet and a parallel line (529) passing through the top end of the notch (513).

A spacing region (537) is indicated on FIG. 5 by densely spaced dotted shading and is the area bounded by:

(a) the MD tab lines (525, 527); and
(b) a pair of TD axes defined by line (529) passing through the top of the notch (513) spaced away from the trailing edge (519) of the sheet and a parallel line (532) passing through the attached end (516) of the tab (507).

A tab region (535) is indicated on FIG. 5 by lightly spaced dotted shading and is the area bounded by:
(a) the MD tab lines (525, 527); and
(b) a pair of TD axes defined by the leading edge (517) of the sheet and a parallel line (532) passing through the attached end (516) of the tab (507).

A sealed region (530) is indicated on FIG. 5 by both dashed diagonal line shading and densely spaced dotted shading and is the area bounded by
(a) the MD tab lines (525, 527); and
(b) a pair of TD axes defined by the trailing edge (519) of the sheet and a parallel line (532) passing through the attached end (516) of the tab (507).

In other words the sealed region (530) is the area of the notch region (528) together with the spacing region (537).

A tear line region (531) is indicated on FIG. 5 by dashed diagonal line shading, densely spaced dotted shading and lightly spaced dotted shading and is the area bounded by:
(a) the MD tab lines (525, 527); and
(b) a pair of TD axes defined by the trailing edge (519) and the leading edge (517) of the sheet.

In other words the tear line region (531) is the combined area of the notch region (528), the spacing region (537) and the tab region (535).

It will be appreciated that to provide a good seal integrity the overlap region (521) outside the tear line region (531) should have a good heat seal and it is desirable that at least the notch region (528) is also sealed to some extent, otherwise leakage can occur via the cut sides (515) of the tab (507) and the notch (513). In fact to provide a better overall seal it is preferred that the whole sealing region (530) is sealed where a double thickness of film exists. It will also be seen that the perpendicular distance between axes 529 and 532 should preferably be selected so the spacing region (537) is sufficiently large in area to provide good seal integrity but not too large to waste film by unnecessarily increasing the area of the overlap region (521).

In one embodiment of the invention the heating surface (201) of a heater bar as shown in FIG. 2 (and used in Example 2) is offered up to the overlap region (521) which is the same size or smaller that the heating surface (201). The shape of the insulator (203) on the heating face (201) is substantially in register with the tear line region (531) so that this region sees reduced temperature and so is weakly heat sealed compare to the rest of the overlap region heated to a higher temperature. Thus the tab on the final pack has a reduced tendency to break off from the film rather than initiating tearing through the overlap region (521): along the tear strip (511). Seal integrity through the tear line region is acceptable.

In another preferred embodiment of the invention the heating surface (101) of a heater bar as shown in FIG. 1 (and used in Example 1) is offered up to the overlap region (521) which is the same size or smaller that the heating surface (101). The shape of the insulator (103) on the heating face (101) is substantially in register with the tab region (535) and the shape of the conducting strip (105) is substantially in register with the sealing region (530), optionally extending beyond the sealing region in the TD. The tab region (535) thus sees reduced temperatures and so is weakly heat sealed (or optionally substantially unsealed) compared to the rest of the overlap region heated to a higher temperature. Furthermore the sealing region (530) is more strongly heated that the tab region (535) so has a better heat seal.

The choice of the materials of respectively the insulator (103) and the conductive strip (105) can be selected to optimise the relative strength of the heat seal in the tab region (535) and the sealing region (530) for a particular pack. Many possibilities are envisaged for example for packs where seal integrity is important the tab region (535) may be unsealed to aid tearing and the sealing region (530) may be more strongly sealed (even than outside the tear line region) so that the strength of the seal throughout across the width of the overlap region is comparable. Alternatively if the film is difficult to tear the strength of the heat seal in the sealing region (530) may be reduced to aid tearing through the double thickness of film in the overlap region (consistent with maintaining an acceptable seal integrity).

Thus in this preferred embodiment the final pack has the advantages of a reduced tendency for the tab to break off from the film rather than initiating tearing through the overlap region (521) along the tear strip (511) together with good seal integrity through the tear line region (531).

To illustrate and explain the invention the following non-limiting examples of the method of the invention were performed as follows:

EXAMPLE 1

Preparation of BOPP Film

A three layer polymeric tube was formed by coextruding a core layer of polypropylene (also as referred to herein as PP) homopolymer with a layer of medium density polyethylene on each side of the core layer. The tube was cooled and subsequently re-heated before being blown to produce a three layer biaxially oriented polypropylene (also referred to herein as BOPP) film having a core layer which was 18.7 µm thick and two outer layers which were each 0.3 µm thick, the film itself being 19.3 µm thick. Any suitable methods can be used to create tear susceptible lines on this conventional BOPP film for example as described below. The outer layers of the film at each surface are heat sealable at conventional temperatures so that this BOPP film can be heat sealed to itself on opposite surfaces (i.e. A to B). The film can be provided with conventional barrier coatings (e.g. to increase oxygen or moisture barrier) depending on the end use of the pack and its nature of the article to be wrapped contents and provided the film is still A to B heat sealable. But such coatings are not necessary for this film which is used only to illustrate the method of the present invention. The same film was used throughout to provide a fair comparison.

A web of a BOPP film prepared as described above was fed at a speed of 200 ft per minute past a 50 W $CO_2$ laser of wavelength 10.6 microns to create two parallel weakened lines along the film web in the MD the lines spaced about 4 mm apart to define a tear strip along the film in the MD. The weakened lines are formed by disrupting the orientation of the BOPP film along the line as more fully described in the applicant's co-pending application PCT/EP02/00075.

A tab knife was located in a conventional tab cutting machine and used to cut at regular intervals along the web a U shaped tab 11.5 mm wide positioned to lie with its free end across the tear strip as shown in the Figures. At the same time the film web was cut into sheets by a sheet knife which cuts across the film web in the TD perpendicular to the MD. The sheet knife cuts across the full width of the film web except for a 8 mm gap in register with the widest part of the tab (due to a corresponding notch positioned on the sheet knife blade) to cut slightly into the sides of the tab. This creates separated sheets with a tab and notch as shown in the Figures. The sheets were fed into a packing machine and used to wrap a pack such as a cigarette carton as described below.

The sheets were wrapped around a mandrel to form a tube with the cut sides with the tab and notch therein overlapping to form an overlap region (521). A carton was positioned inside the tube. The overlap (521) was offered up to a lateral metal heat sealing bar constructed as shown in FIG. 1. The sealing bar had an insulating material (103) inserted in the bar heating surface (101) positioned to be in register with the tab region (535) of the overlap region (521). The insulator (103) reduced the temperature of the bar in that region of the heating surface (101) so the film did not heat seal as readily giving a weaker heat seal in tab region (535) located underneath the insulator (103) when the bar was pressed against the overlap (521). A thin strip (105) made from a conductive material was also inlayed into the bar heating surface (101) and was set just above the insulator (103) to be in register with the sealing region (530) on the overlap. This strip (105) was heated to a similar temperature to the non insulated heating surface (101) so film within the sealing region (530) experienced a sufficiently high temperature to be heat sealed, whilst the tab region (535) opposite the insulator (103) remained weakly sealed.

To help opening of the pack the free end (406, 506) of the tab (407, 507) was positioned on the pack so it protrudes from the side of the pack and so was completely unsealed.

After the tube is formed as described above, both the open ends were folded around the carton and heat sealed in a conventional manner using conventional cigarette wrapping equipment to so the cartons is tightly overwrapped with the heat shrunk film to form a pack having a pull tab straddling a tear strip (411, 511) which ran around the circumference of the pack for ease of opening.

EXAMPLE 2

A similar pack can be made as described in Example 1 by using a heat sealing bar in which the insulator (203) is inserted across the full width (short axis) of the heating surface (201) (i.e. there is no thin heat seal strip inlayed— see FIG. 2). When the bar is offered to the overlap region the insulator (203) is held in register with the whole of the tear line region (531) which is thus weakly sealed so that a tear can readily propagate along the tear strip (511) through the overlap region (521) where there is a double thickness of film on the pack.

For comparison packs were wrapped according to two known methods.

Comp A

A package can be made as described in Example 1 in which a conventional solid metal bar heater without an insulator (not shown) was used to heat seal the whole of the area of overlap region (521) to a uniform seal strength.

Comp B

A package can be made as described in Example 1 in which the heater used was a conventional solid metal bar heater (shown in FIG. 3) in which a gap (303) had been machined in the heating surface (301) to correspond to the tear line region (531) so this region on the pack is not heated and is entirely unsealed.

Results

Seal integrity of a pack can be measured by a AR-Jay seal integrity test unit in which the pack is held onto a surface of the unit by reduced pressure, the side of the pack against the unit is then pierced and air fed through the hole. The air fed inside the package balances air flowing out of the package through leakage around the seals; Thus the steady state pressure of the air supplied from the unit is a proportional to the seal integrity of the package. Obviously packs with a higher the seal integrity provide more protection to their contents (e.g. from oxygen or moisture) for longer.

Packs made as described in Example 1 were easy to open through the overlap region and had a reduced tendency for the tab to pull off the pack rather than initiate tearing as the weak sealing of the tab do not present a significant problem. They were also found to have good seal integrity.

Packs made as described in Example 2 were also easy to open as those made in Example 1, but had lower seal integrity than Example 1. However some sealing can occur through (poor) conduction through the insulator to the film in the tab region, so the region is not completely unsealed (as in Comp B).

Packs made as described in Comp A were more difficult to open cleanly through the overlap region with the tabs breaking off more often or their ends being difficult to find, although the packs had acceptable seal integrity as the overlap region was completely sealed.

Packs made as described in Comp B could be opened cleanly through the overlap region but the packs had poor seal integrity as no effective sealing occurred in tab region where the heater bar had been machined away.

The packs made in Example 1 and 2 were both ease to open. Example 1 is more preferred than Example 2 as the packs have a better seal integrity.

Thus it can be seen that packs made according the Example 1 or 2 are both improved to those made as Comp A which are more difficult to open than Examples 1 and 2 or those made as Comp B which have poorer seal integrity than either of Examples 1 or 2.

The invention claimed is:

1. A method for wrapping an article using a web of packaging film having at least one tear line thereon in a machine direction (MD), the method comprising the steps of:
  (a) forming at regular intervals in the MD a tab on the film, the tab having a free end connected by free sides to an end attached to the film, the tab being positioned on the film so the axis of at least one tear line in the MD passes through both ends of the tab;
  (b) severing the film web to form sheets with leading and trailing cut sides by cutting substantially along an axis across a transverse direction (TD) of the web, the axis passing across the tab between its ends, where the tab along said axis is not substantially severed there through so the tab protrudes from the leading cut sides of the sheet;
  (c) wrapping a sheet formed from step (b) around an article to form a tube with the cut sides of the sheet overlapping, where the free end of the tab lies on the top of the overlap on the outside of the tube and where the cut sides of the sheet overlap to the extent that a spacing region exists wholly within the overlap region, the spacing region defined by the sides of the film and a first pair of axes comprising of one axis in the TD spaced from the trailing cut side of the sheet underneath the overlap and an axis in the TD passing through the attached end of the tab;

(d) sealing the film together within the overlap region by a sealing means which:
  (i) seals substantially completely outside a tab region defined by the leading cut side of the overlap region and a second pair of axes in the MD perpendicular to the first pair defining the spacing region, the second pair passing through the respective widest points for each free side of the tab; and
  (ii) seals inside the tab region substantially only within the spacing region so the free end of the tab remains substantially unsealed to the film; and
(e) wrapping the ends of the tube around the article and sealing the ends to form a sealed package around the article, the package being readily openable by pulling the free tab end to initiate tearing along the tear line.

2. A method as claimed in claim 1, in which in step (a) the tab is formed by cutting the film by a contact means or non-contact means.

3. A method as claimed in claim 1, in which in step (b) the film web is severed to form sheets to form a partially protruding tab on the leading edge of one sheet and a corresponding notch in the trailing edge of the following sheet.

4. A method as claimed in claim 1, in which in step (c) the sheet is wrapped around an article to form a tube where the spacing region is defined by the sides of the film and a first pair of axes in the TD parallel to the tube axis along the overlap passing through respectively the top of the notch and the attached end of the tab.

5. A method as claimed in claim 1, in which in step (d) film in the overlap region is heat sealed together.

6. A method as claimed in claim 5 where the heat seal is caused by a heating element pressed against the film; the element shaped to seal the film substantially completely over the overlap region outside the tab region and within the spaced region only inside the tab region.

7. A method as claimed in claim 1, in which the tear line on the film comprises a tear tape.

8. A method as claimed in claim 1, in which said at least one tear line comprises two tear lines with the material within the tear lines having a substantially different orientation to material in the rest of the film.

9. A method as claimed in claim 1, in which the film along the tear line has substantially the same gauge as the rest of the film.

10. A method as claimed in claim 1, in which the film comprises polymeric material.

11. A method as claimed in claim 10, in which the film comprises a thermoplastic polymer.

12. A method as claimed in claim 11, in which the film comprises a polyolefin and/or polyester.

13. A method as claimed in claim 12, in which the film comprises polypropylene.

14. A method as claimed in claim 1, in which the film is substantially oriented in at least one direction.

15. A method as claimed in claim 1, in which the film is biaxially oriented in substantially mutually perpendicular directions.

* * * * *